(12) United States Patent
LaBruyere

(10) Patent No.: US 8,882,434 B2
(45) Date of Patent: Nov. 11, 2014

(54) VEHICLE WHEEL DOLLY

(76) Inventor: Kenneth LaBruyere, Allenton, MI (US)

( * ) Notice: Subject to any disclaimer, the term of this patent is extended or adjusted under 35 U.S.C. 154(b) by 1055 days.

(21) Appl. No.: 12/321,301

(22) Filed: Jan. 16, 2009

(65) Prior Publication Data

US 2009/0191035 A1     Jul. 30, 2009

Related U.S. Application Data

(60) Provisional application No. 61/022,321, filed on Jan. 19, 2008.

(51) Int. Cl.
*B60B 29/00* (2006.01)
*B62B 5/00* (2006.01)

(52) U.S. Cl.
CPC ........... *B62B 5/0083* (2013.01); *B62B 2202/90* (2013.01)
USPC ......................................... 414/426; 280/79.4

(58) Field of Classification Search
USPC .......... 414/427, 428, 429, 426, 430; 254/7 B; 280/79.4
See application file for complete search history.

(56) References Cited

U.S. PATENT DOCUMENTS

| | | | | | |
|---|---|---|---|---|---|
| 857,660 | A | * | 6/1907 | Norwood | 414/430 |
| 1,536,611 | A | * | 5/1925 | Duke | 414/469 |
| 2,358,864 | A | * | 9/1944 | Lockwood | 414/430 |
| D139,552 | S | * | 11/1944 | McCann | D34/18 |
| 2,369,603 | A | * | 2/1945 | Phillips | 414/427 |
| 2,569,982 | A | * | 10/1951 | Estel, Jr. | 187/217 |
| 2,607,607 | A | * | 8/1952 | Day | 280/62 |
| 2,640,615 | A | * | 6/1953 | Wedel | 414/428 |
| 3,035,812 | A | * | 5/1962 | Wineteer | 254/2 R |
| 3,830,387 | A | * | 8/1974 | Virnig | 414/427 |
| 4,465,421 | A | * | 8/1984 | Murillo | 414/430 |
| 4,596,506 | A | * | 6/1986 | Burgardt et al. | 414/426 |
| 4,913,459 | A | * | 4/1990 | Smeitink | 280/641 |
| 4,950,121 | A | * | 8/1990 | Meyer et al. | 414/428 |
| 4,976,449 | A | | 12/1990 | Lotspeich | |
| 5,248,235 | A | * | 9/1993 | Poten et al. | 414/430 |
| 5,249,907 | A | * | 10/1993 | Poten et al. | 414/430 |
| D346,252 | S | | 4/1994 | Jones et al. | |
| 5,609,461 | A | * | 3/1997 | Lichtenberg | 414/426 |
| 5,709,520 | A | * | 1/1998 | Pish | 414/427 |
| 5,732,960 | A | | 3/1998 | Elam | |
| 5,984,611 | A | | 11/1999 | Warner | |
| D532,575 | S | | 11/2006 | Oberg | |
| 7,232,138 | B2 | | 6/2007 | Shubert | |
| 2005/0284826 | A1 | * | 12/2005 | Johnson | 211/20 |

* cited by examiner

*Primary Examiner* — Saul Rodriguez
*Assistant Examiner* — Glenn Myers
(74) *Attorney, Agent, or Firm* — Mastrogiacomo PLLC

(57) ABSTRACT

A vehicle wheel dolly is provided that includes a well for positioning and capturing a tire and wheel assembly of an automobile, the well including a generally flat first plate, a first side wall, a second side wall, a rear wall, a second plate, a third plate, a plurality of casters secured to said wheel dolly and wherein a first set of casters of said plurality of casters are secured to said second plate and said third plate near said rear wall and a second set of casters of said plurality of casters are secured to said second plate and said third plate, said second set of casters configured to be positioned on said second plate and said third plate to create a fulcrum thereby enabling said vehicle wheel dolly to pivot about said second set of casters as the wheel and tire assembly enter said well.

20 Claims, 12 Drawing Sheets

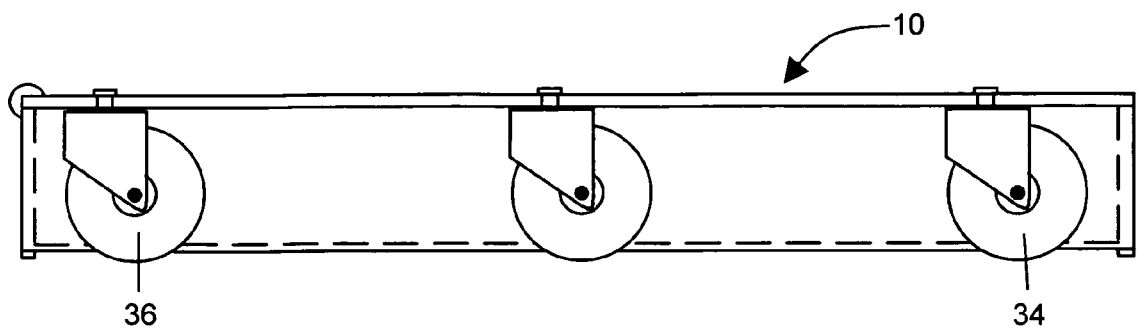
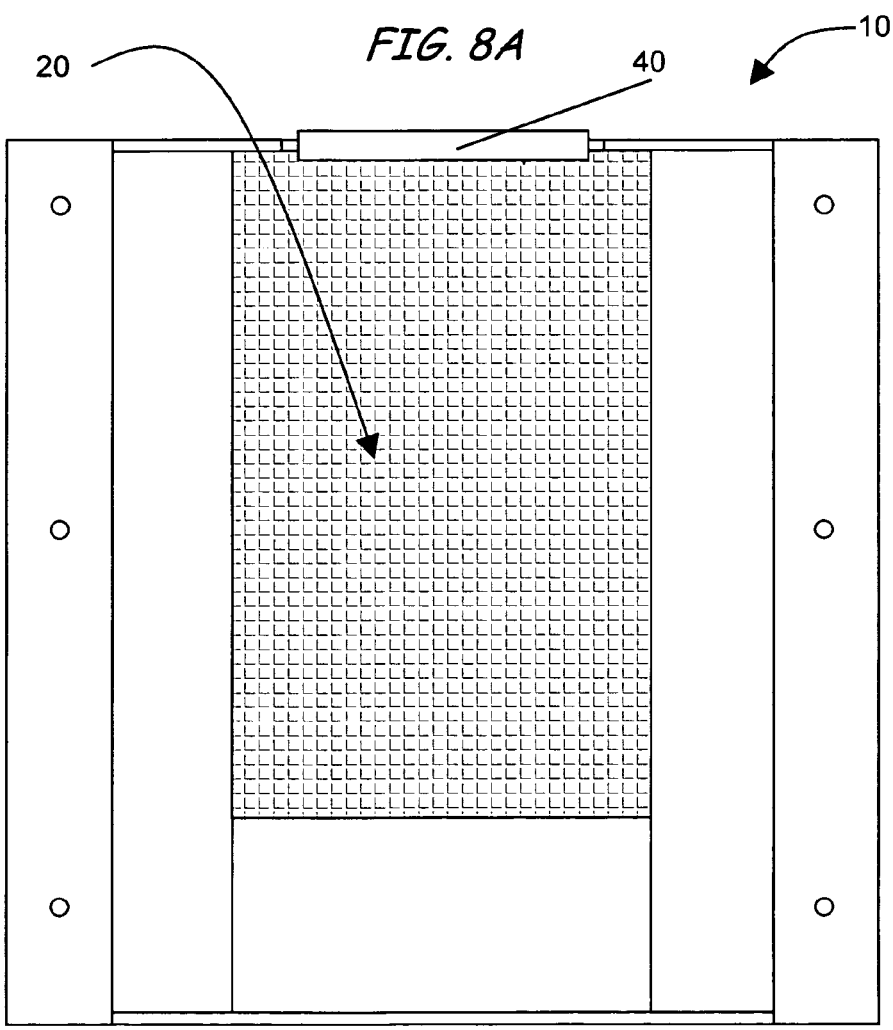
FIG. 8A
FIG. 8B

VEHICLE WHEEL DOLLY

CROSS REFERENCE TO RELATED APPLICATIONS

This patent application claims the benefit of priority based on U.S. Provisional Patent Application No. 61/022,321 filed on Jan. 19, 2008, which is incorporated by reference in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON COMPACT DISC

Not Applicable

BACKGROUND OF THE INVENTION

1. Field of the Invention

The present invention relates generally to apparatuses for elevating and moving vehicles about a surface, and, more specifically to a vehicle wheel dolly that may be used to elevate a vehicle without the use of a vehicle lifting device.

2. Background Art

There is often a need to manually move vehicles about a service garage or storage area without operating and moving the vehicle under its own power. One such way to move vehicles is to manually push the vehicles about the garage on its own four wheels and tires. Because these vehicles may weigh several thousand pounds, moving vehicles manually in this manner may be time consuming and cumbersome. Often the vehicles may only be moved easily in one direction, forward and rearward. Many times a second or third individual may be needed to steer the vehicle in the intended direction of movement.

Another means used to move vehicles about the garage is with a motorized vehicle dolly. A single individual may operate the motorized dolly and move the vehicle. The motorized dolly may engage two or four of the wheels of the vehicle and can be used to move the vehicle easily about any area. While these motorized dollies are useful, they are often expensive and not practical for everyday use by small repair shop operators or individual vehicle owners that do their own repair work or vehicle modifications.

Another possible means of moving vehicles about a garage or storage area is with the use of wheel dollies. Wheel dollies are generally constructed of metal plates having casters or rollers that are capable of supporting a wheel assembly of a vehicle. These casters or rollers are capable of rotating 360 degrees so that the dolly may move easily in any direction. Individual dollies may be positioned under each of the four wheels or either the two front or two rear wheels such that the vehicle may be elevated from the surface on the dollies. Once elevated on the dollies, the vehicle may be moved easily in any direction by simply pushing the vehicle about an area. The smaller casters or rollers have much lower frictional forces to over come than the larger wheels of a vehicle, thus allowing for the vehicle to be easily moved when positioned on the dollies.

The difficult aspect with this mode of moving vehicles is that the vehicle must be lifted off the floor or ground and a dolly positioned under each of the wheels to be elevated. Many times a mechanized floor lift may be used to elevate a vehicle weighing several thousand pounds so that the dollies may be positioned under each wheel and the vehicle lowered onto them. Often, individual car owners who work on their own cars or small shop owners can not afford these expensive and space consuming lifts to raise a vehicle to a point where dollies may be placed under each wheel. These individuals must resort to "jacking up" or raising a single wheel at a time and sliding a dolly under the tire, then move to the next wheel to repeat the process. This process may be very time consuming, and, more importantly, a safety risk to the individual performing the operation.

Therefore, a need exists for a vehicle wheel dolly having wheels or casters that not only allows an individual to move a vehicle with ease in any direction, but also allows the individual to position the dolly under each wheel without having to first raise the vehicle off the ground with a lift or jack.

BRIEF SUMMARY OF THE INVENTION

In accordance with the present invention, a vehicle wheel dolly is provided that includes a well for positioning and capturing a tire and wheel assembly of an automobile, the well including a generally flat first plate, a first side wall, said first side wall extending generally upward from said first plate at a first side edge, a second side wall, said second side wall extending generally upward from said first plate at a second side edge, a rear wall, said rear wall extending generally upward from said first plate at a rear edge and intersecting said first side wall and said second side wall, a second plate, said second plate extending generally horizontally outward from said first side wall at a top edge, a third plate, said third plate extending generally horizontally outward from said second side wall at a top edge, a lip, the lip extending vertical upward and downward from said first plate at a front edge and configured to engage a ground surface as the tire and wheel assembly enter the well, a roller assembly, the roller assembly secured to the rear wall near a top edge and configured to absorb forces exerted on the wheel dolly as the tire and wheel assembly enter the well a plurality of casters secured to said wheel dolly and wherein a first set of casters of said plurality of casters are secured to said second plate and said third plate near said rear wall and a second set of casters of said plurality of casters are secured to said second plate and said third plate said second set of casters configured to be positioned on said second plate and said third plate to create a fulcrum thereby enabling said vehicle wheel dolly to pivot about said second set of casters as the wheel and tire assembly enter said well.

BRIEF DESCRIPTION OF THE SEVERAL VIEWS OF THE DRAWINGS

The features and inventive aspects of the present invention will become more apparent from the following detailed description, claims, and drawings, of which the following is a brief description:

FIG. 8A is a side view of the vehicle wheel dolly according to another embodiment of the present invention;

FIG. 8B is a top view of the vehicle wheel dolly according to an embodiment of the present invention;

DETAILED DESCRIPTION OF THE INVENTION

Figure 1:
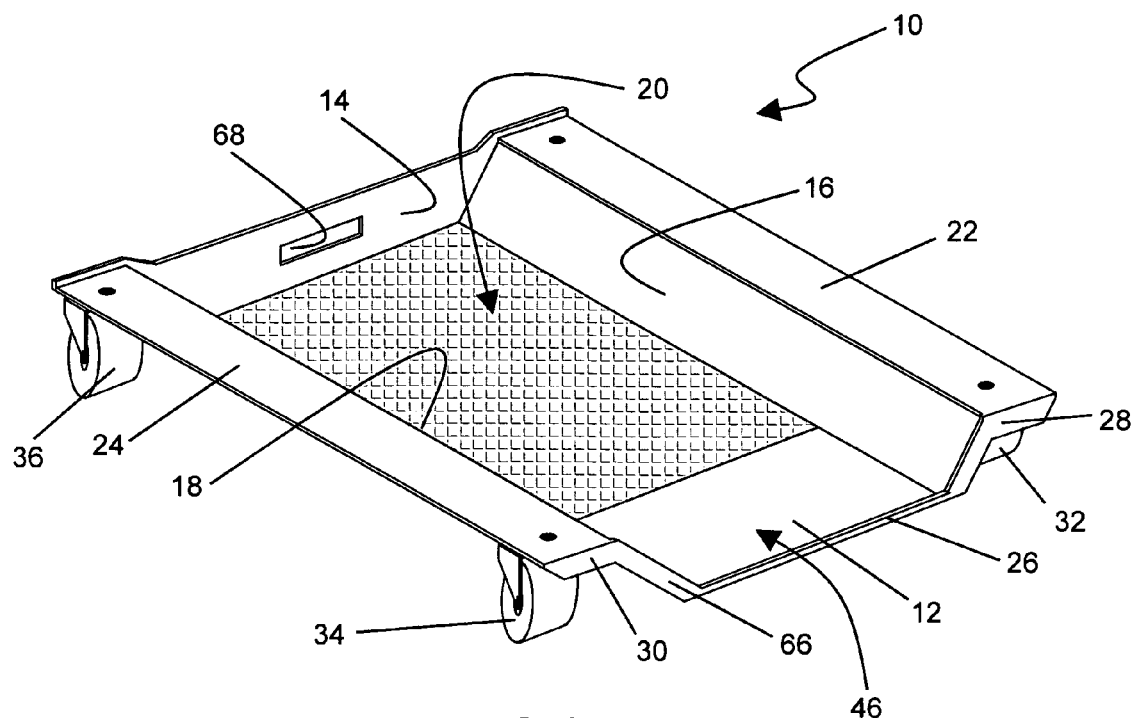
FIG. 1 is a perspective view of a vehicle wheel dolly according to an embodiment of the present invention.

Referring now to the drawings, several preferred illustrative embodiments of the present invention are shown in detail. Although the drawings represent several embodiments of the present invention, the drawings are not necessarily to scale and certain features may be exaggerated to better illustrate and explain the present invention. Further, the embodiments set forth herein are not intended to be exhaustive or otherwise to limit or restrict the invention to the precise forms and configurations shown in the drawings and disclosed in the following detailed description.

Figure 2:
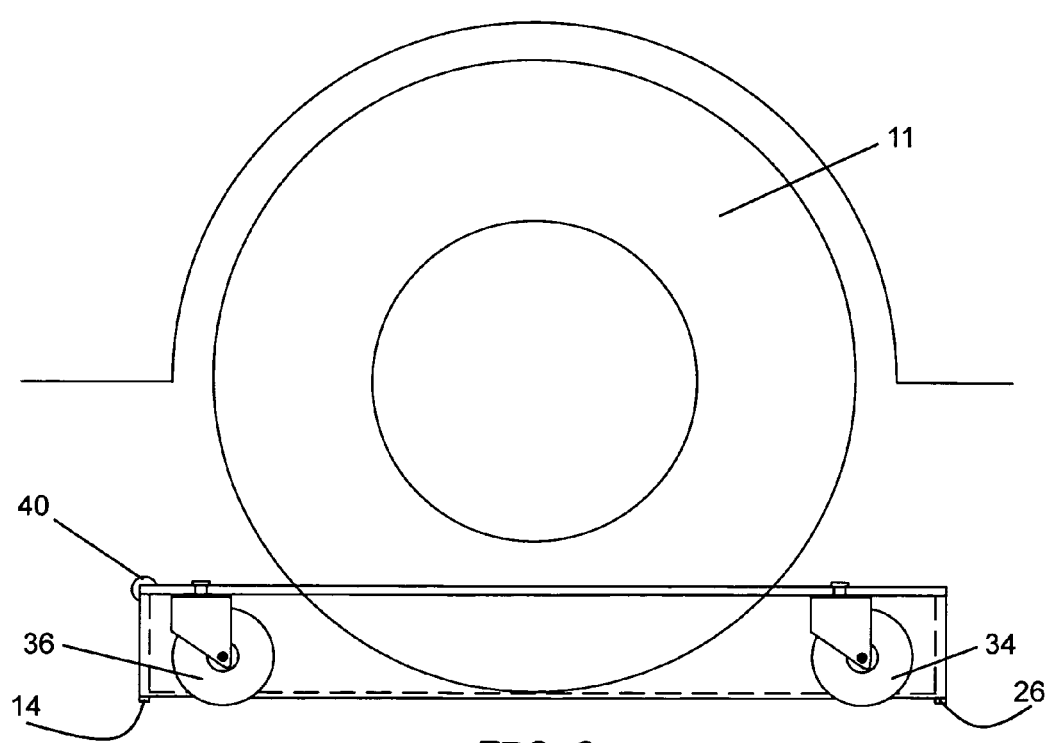
FIG. 2 is a side view of a wheel and tire assembly of a vehicle positioned on the vehicle wheel dolly according to another embodiment of the present invention.

A vehicle wheel dolly 10 is illustrated in FIGS. 1 and 2 having a plate 12 that includes a rear wall 14 extending generally vertical from plate 12. Rear wall 14 may include an aperture 68 sized large enough to be used as a handle for lifting dolly 10. Plate 12 further includes a pair of side walls 16 and 18 that extend generally outward from plate 12 and intersect rear wall 14. The intersections of plate 12, rear wall 14 and side walls 16 and 18 create a well 20 for capturing a wheel and tire assembly 11 of a vehicle. In this particular embodiment, side walls 16 and 18 are shown extending from plate 12 at a particular angle. It is important to note that side walls 16 and 18 may extend from plate 12 at any angle. Extending generally horizontal from the top portion of side wall 16 and 18 respectively are flats 22 and 24. Flats 22 and 24 intersect rear wall 14 near a top edge of rear wall 14.

Figure 3A:
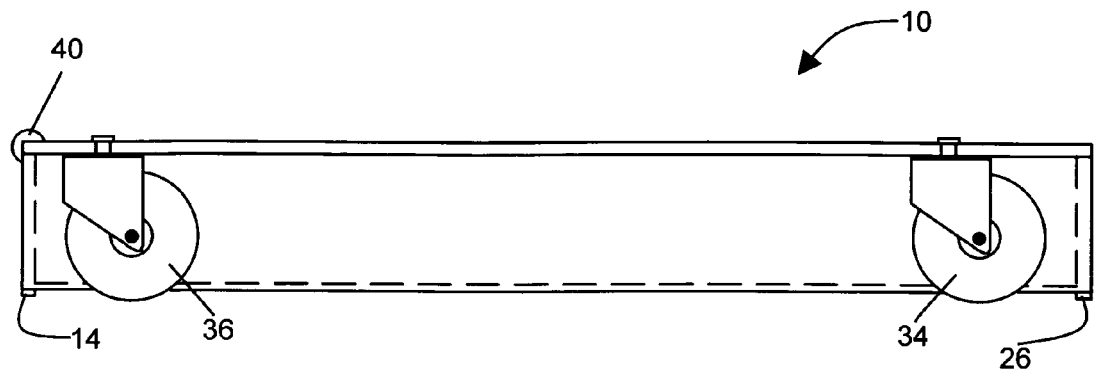
FIG. 3A is a side view of the vehicle wheel dolly according to an embodiment of the present invention.
Figure 3B:
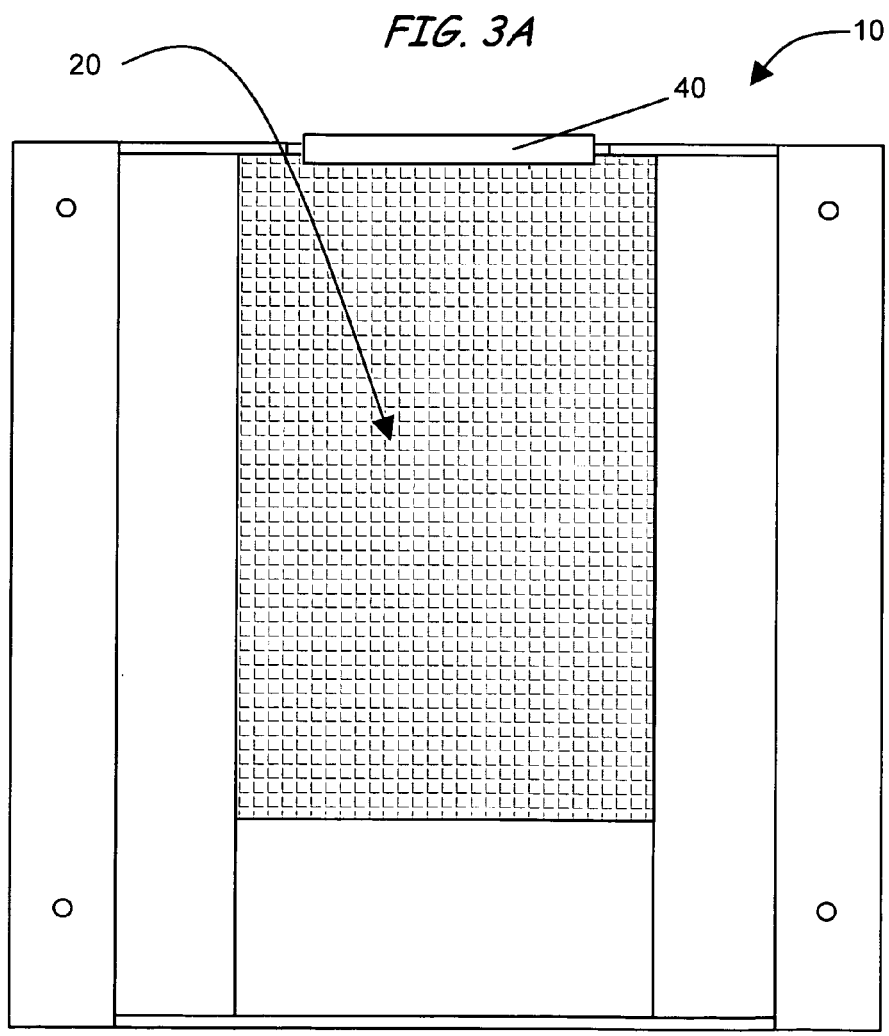
FIG. 3B is a top view of the vehicle wheel dolly according to an embodiment of the present invention.
Figure 3C:
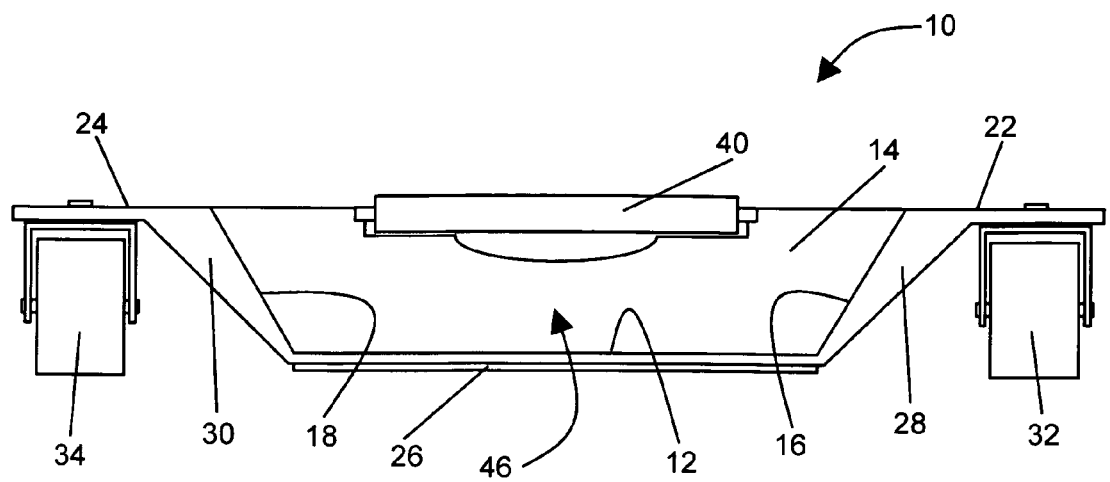
FIG. 3C is a front view of the vehicle wheel dolly according to an embodiment of the present invention.
Figure 3D:
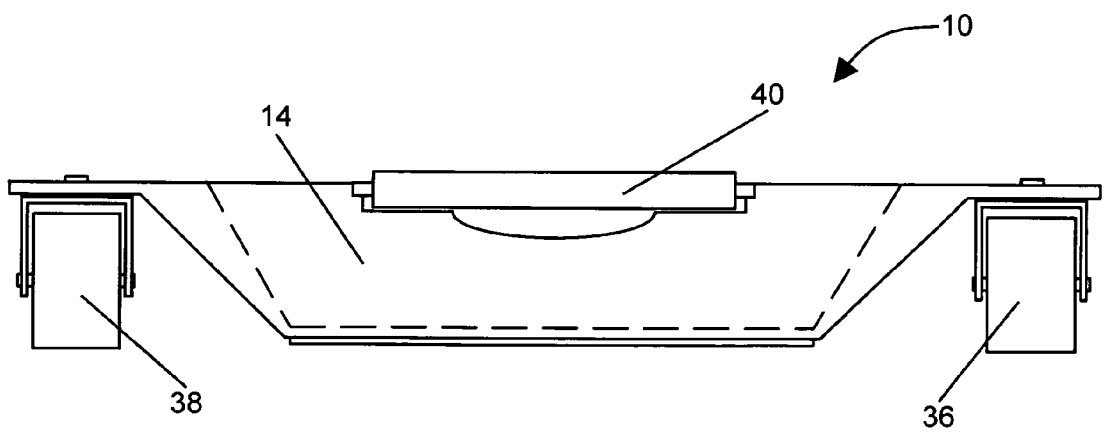
FIG. 3D is a rear view of the vehicle wheel dolly according to an embodiment of the present invention.

A lip 26 extends generally vertical from a front edge of plate 12. Lip 26 may be sized to allow wheel and tire assembly 11 to scale lip 26 rather effortlessly such that wheel and tire assembly 11 may move into or out of well 20 with minimal force (see e.g. FIG. 2). Lip 26 may also extend slightly below plate 12 as illustrated in FIGS. 2 and 3A. Lip 26 protrudes below plate 12 to limit the amount of tilt or lift that dolly 10 will experience as wheel and tire assembly 11 enter well 20. Similarly, rear wall 14 may also extend slightly below plate 12. The extension of rear wall 14 below plate 12 may prevent dolly 10 from tipping upward excessively when wheel and tire assembly 11 contact rear wall 14 after entering well 20. Limiting the excessive upward motion of dolly 10 as wheel and tire assembly 11 move into and out of well 20 will aid in preventing dolly 10 from contacting and possibly damaging the vehicle.

Dolly 10 also includes wings 28 and 30 that extend generally outward from plate 12 at lip 26 to intersect side walls 16 and 18 and flats 22 and 24. Wings 28 and 30 extend in such a manner from plate 12 such that an opening 46 is left at lip 26 to allow for the passage of wheel and tire assembly 11 into and out of well 20. Dolly 10 may be fabricated in this manner to provide stability and strength to capture any size wheel and tire assembly in well 20.

Figure 9A:
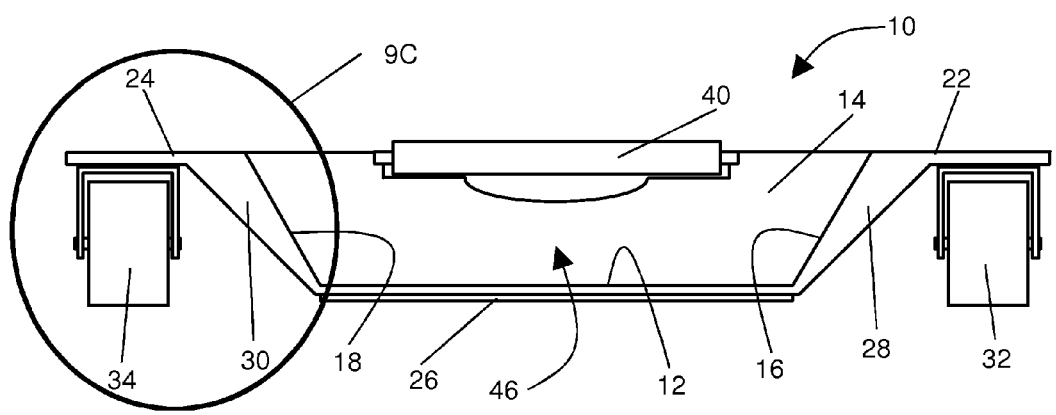
FIG. 9A is a front view of the vehicle wheel dolly according to another embodiment of the present invention.
Figure 9B:
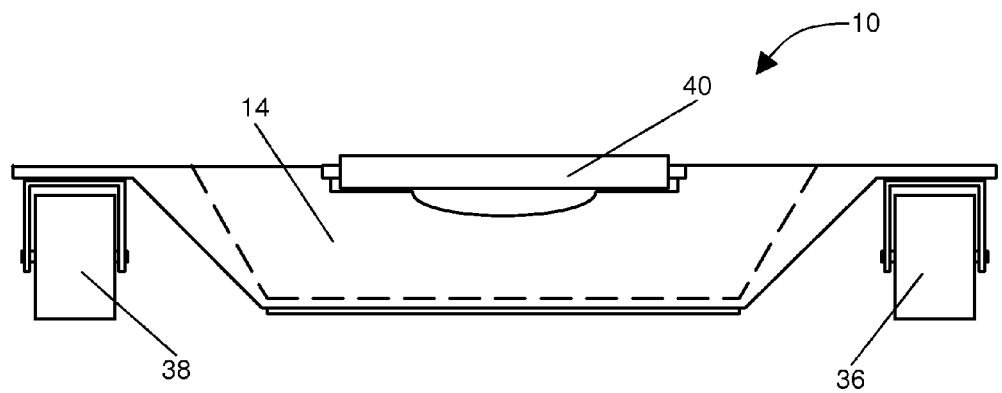
FIG. 9B is a rear view of the vehicle wheel dolly according to another embodiment of the present invention.
Figure 9C:
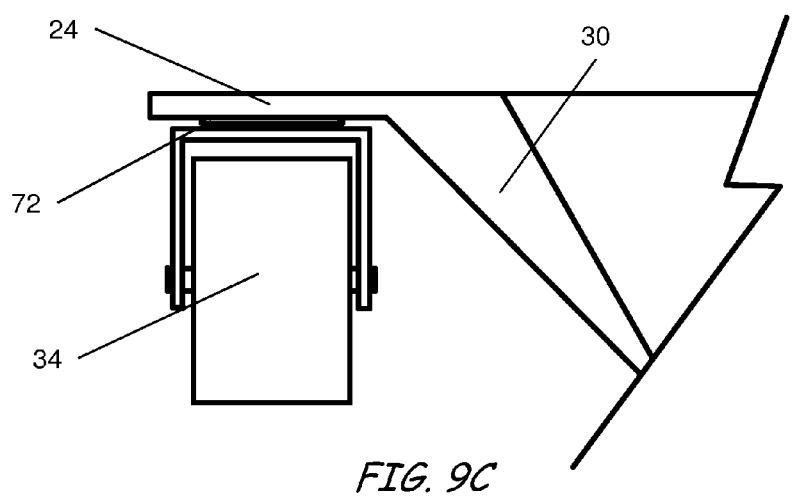
FIG. 9C is an enlarged view of the wheel assembly of the vehicle wheel dolly of FIG. 9A according to an embodiment of the present invention.

Positioned at four corners of dolly 10 are four wheels or casters 32, 34, 36 and 38. Wheels 32, 34, 36 and 38 allow for dolly 10 to be rolled upon any generally flat surface. Wheels 32, 34, 36 and 38 may be any type of standard wheel or caster that are well known in the art and are capable of supporting the weight or partial weight of a vehicle. Wheels 32, 34, 36 and 38 may be secured to dolly 10 at flats 22 and 24 either by welding the wheel assemblies to the flats (See e.g. FIGS. 9A-9C) with a typical welding material 72 or by fastening wheel assemblies to the flats through a hole or holes in the flats and using a common nut and bolt assembly to securely fasten wheels 32, 34, 36 and 38 to flats 22 and 24.

Alternatively, as illustrated in FIGS. 2 and 3A-3D, rear wall 14 may include a roller assembly 40 to aid in absorbing any excess force that may be exerted by wheel and tire assembly 11 to overcome lip 26 when entering well 20. Roller assembly 40 may also be used as a handle for easily carrying dolly 10.

Vehicle wheel dolly 10 may be operated in the following manner. Dolly 10 may be positioned either in front of or behind wheel and tire assembly 11 (the operational description will continue as though wheel dolly 10 were positioned in front of wheel and tire assembly 11). Once positioned, the vehicle may be pushed forward such that wheel and tire assembly 11 encounters lip 26 of dolly 10. The distance between plate 12 and the surface wheel and tire assembly 11 is resting on is such that minimal force may be required for wheel and tire assembly 11 to climb lip 26 and enter well 20. However, as wheel and tire assembly begins to climb lip 26, some titling upward of the rear section of dolly 10 may occur as a large amount of vehicle weight is introduced at the front section of dolly 10. The portion of lip 26 that extends below plate 12 will act to limit any upward tilting of the rear section of dolly 10 in an attempt to prevent the rear section of dolly 10 from contacting the vehicle. Similarly, as wheel and tire assembly 11 continues forward in well 20 and approaches rear wall 14, the front section of dolly 10 may begin to tilt upward. As with lip 26, the portion of rear wall 14 that extends below plate 12 will operate to limit the upward tilt of the front section of dolly 10, thereby aiding in the attempt to prevent dolly 10 from contacting the vehicle. Wheel and tire assembly 11 will be seated about the middle of well 20 to distribute weight evenly throughout dolly 10. The above is an illustrative example of how to position the wheel and tire assembly on vehicle wheel dolly 10. Other means to position the wheel and tire assembly on dolly 10 may include operating the vehicle and driving the wheel and tire assembly into well 20 and onto dolly 10. Once wheel and tire assembly 11 is elevated and seated in well 20 and the vehicle is secured (i.e. gear selector is placed in park, wheels chocked, brakes applied, etc.), the vehicle may be easily pushed about the surface in any direction on dolly 10 and casters 32, 34, 36 and 38.

Vehicle wheel dolly 10 may be removed from the vehicle in much the same manner as dolly 10 was introduced. When the desired location is reached, wheel and tire assembly 11 may be removed from well 20 simply by pushing the vehicle in the opposite direction from loading wheel and tire assembly 11 into well 20. The front section of dolly 10 may again tilt upward as wheel and tire assembly 11 encounters and climbs lip 26 on its way out of well 20. As described above, the portion of lip 26 that extends below plate 12 may limit the upward tilt of the front section of dolly 10. Once out of well 20, wheel and tire assembly 11 will back resting on the surface once again and no longer elevated on dolly 10.

Figure 4A:
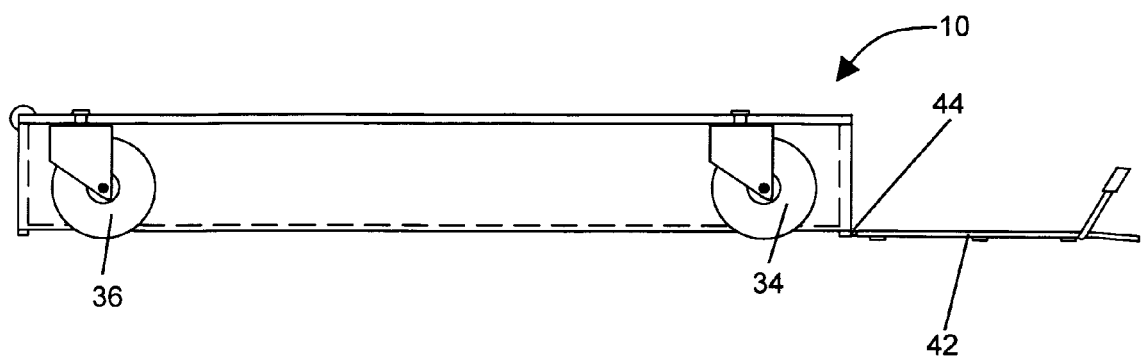
FIG. 4A is a side view of the vehicle wheel dolly according to yet another embodiment of the present invention.
Figure 4B:
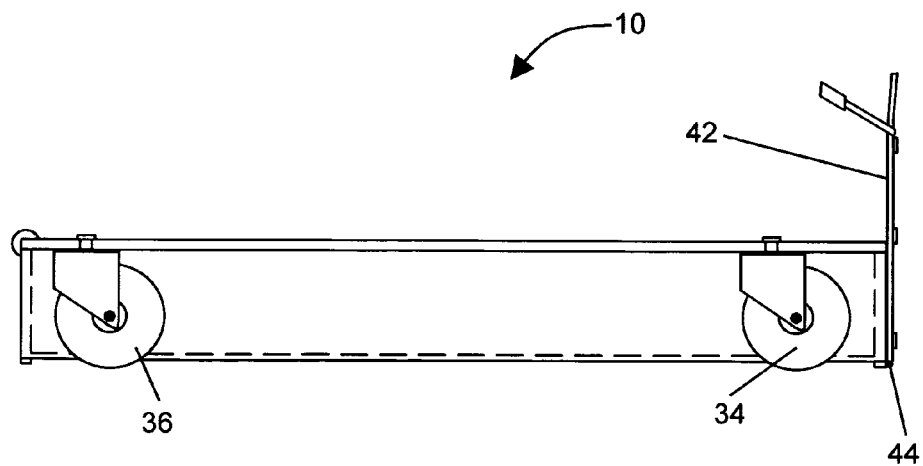
FIG. 4B is a side view of the vehicle wheel dolly according to an embodiment of the present invention.
Figure 4C:
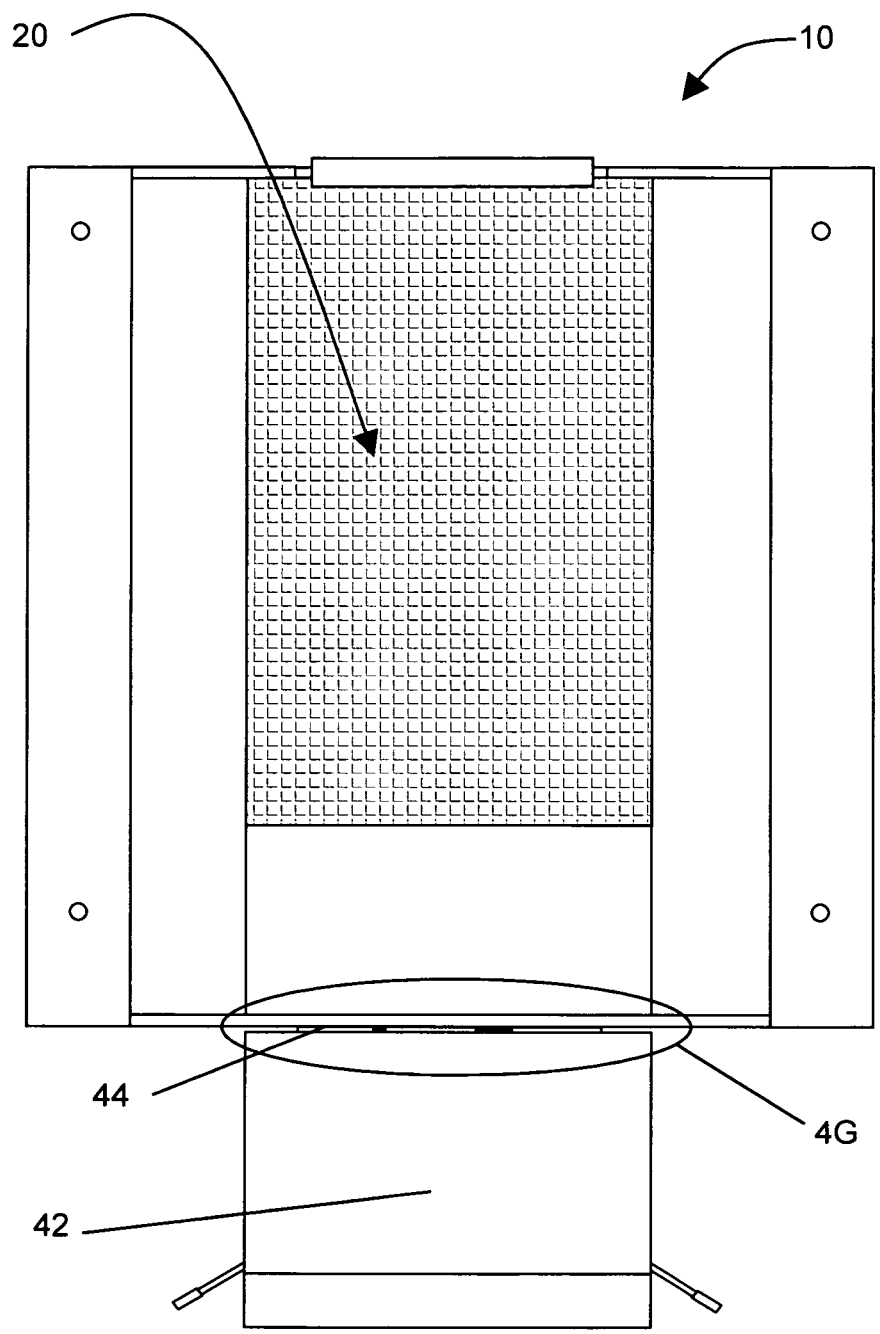
FIG. 4C is a top view of the vehicle wheel dolly according to an embodiment of the present invention.
Figure 4D:
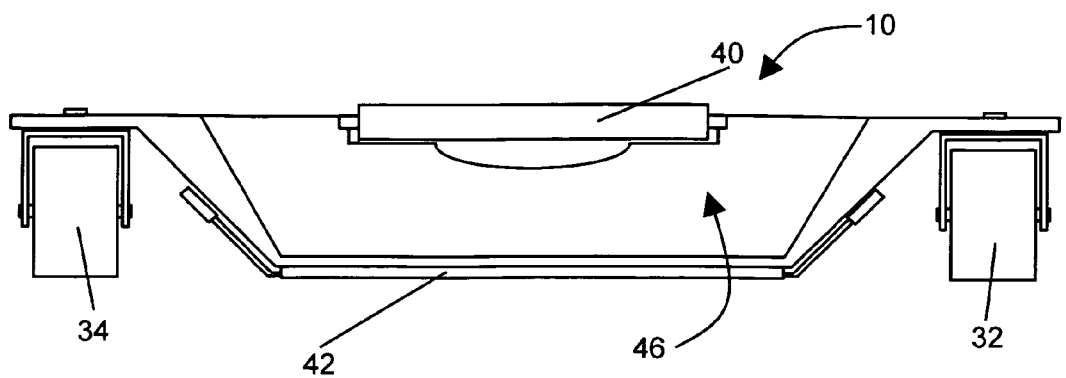
FIG. 4D is a front view of the vehicle wheel dolly according to an embodiment of the present invention.
Figure 4E:
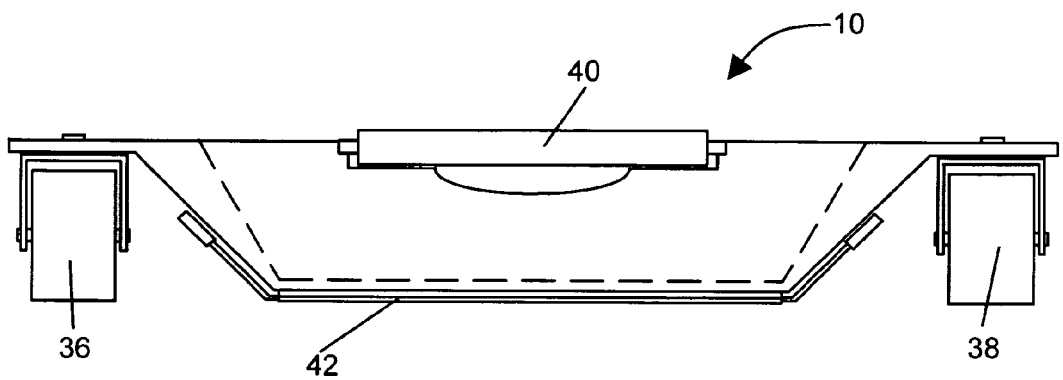
FIG. 4E is a rear view of the vehicle wheel dolly according to an embodiment of the present invention.
Figure 4F:
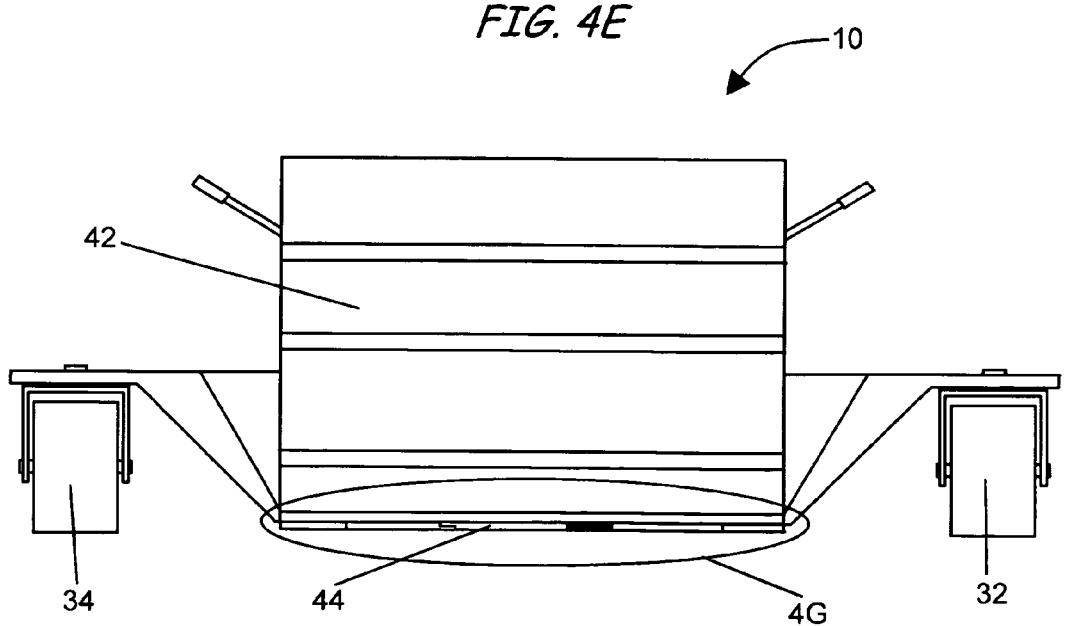
FIG. 4F is a front view of the vehicle wheel dolly according to an embodiment of the present invention.
Figure 4G:
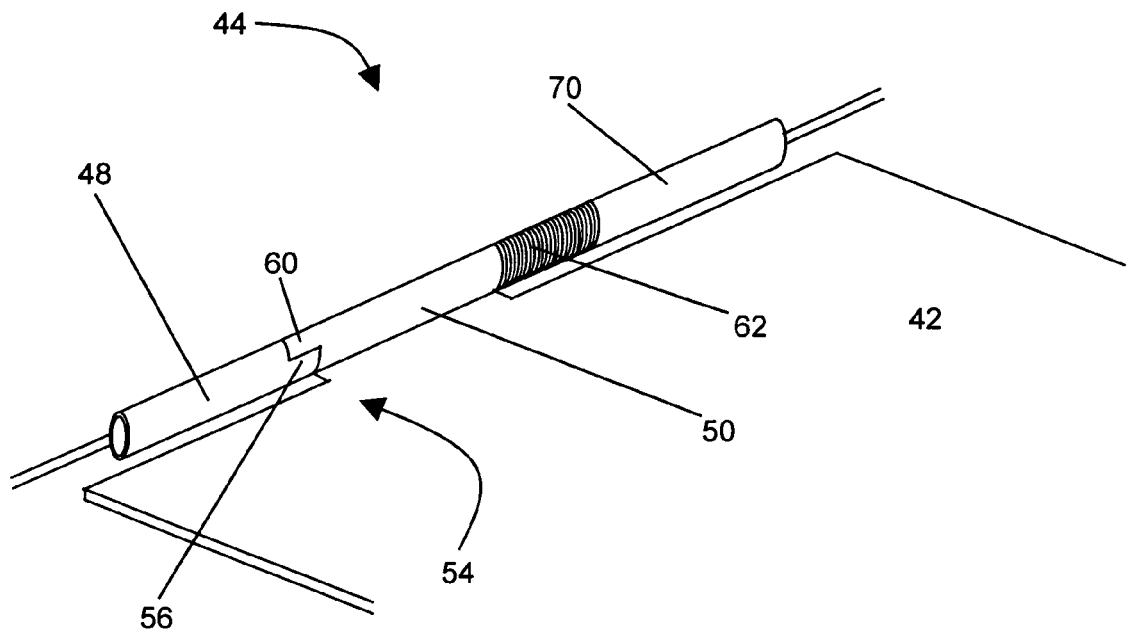
FIG. 4G is an enlarged view of the hinge assembly of FIGS. 4C and 4F according to an embodiment of the present invention.
Figure 4H:
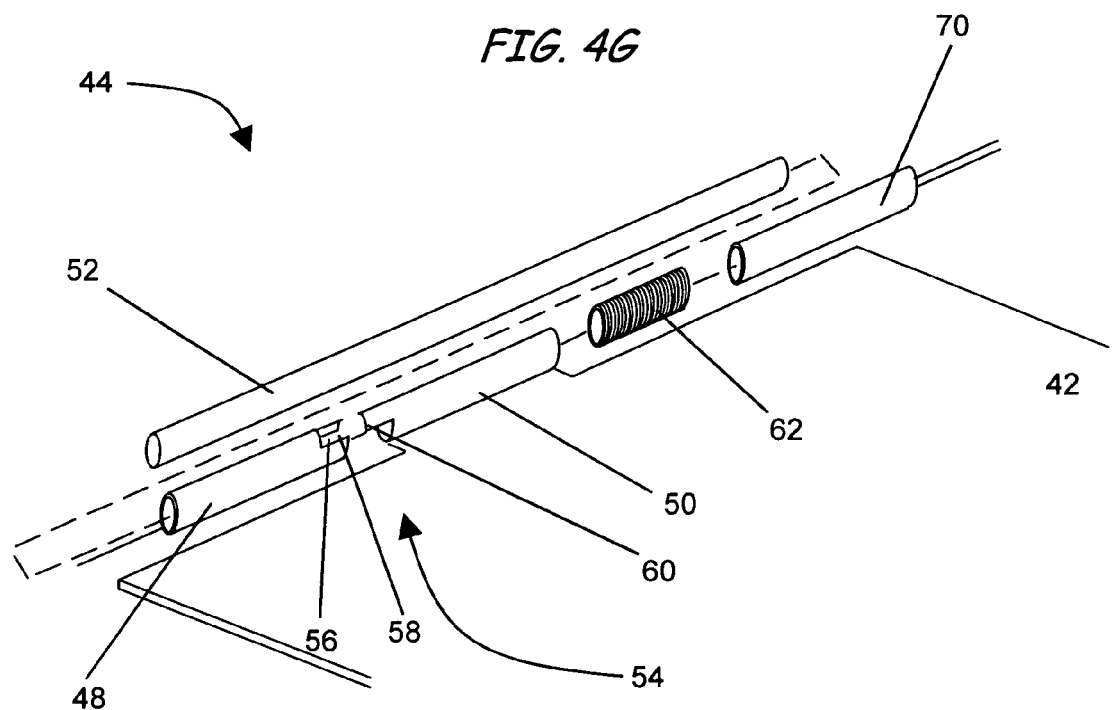
FIG. 4H is an exploded view of the hinge assembly of FIG. 4G according to an embodiment of the present invention.

In another embodiment of the present invention illustrated by FIGS. 4A-4H, dolly 10 may include a tailgate 42 and a hinge assembly 44. Tailgate 42 may be secured to plate 12 of dolly 10 at opening 46 with hinge assembly 44. As shown in FIG. 4G, plate 12 may include cylinders 48 and 70 and tailgate 42 may include cylinder 50 such that when plate 12 and tailgate 42 are positioned, cylinders 48, 70 and 50 may be aligned so that a shaft 52 may be introduced through cylinders 48, 70 and 50 to secure tailgate 42 to plate 12. Cylinders 48, 70 and 50 and shaft 52 are manufactured and positioned such that hinge assembly 44 is created and tailgate may be rotated from a lower position to upper position with respect to dolly 10.

Hinge 44 may include a locking mechanism 54 that will secure tailgate 14 in either the upper or lowered position. Cylinders 48 and 50 may be used in one such locking mechanism. In this particular locking mechanism 54, cylinder 48 of plate 12 includes a first slot 56 and a second slot 58 for engaging a pin 60 of cylinder 50. As tailgate 42 is in the upper position, pin 60 of cylinder 50 engages first slot 56 of plate 12. When there is a desire to lower tailgate 42, tailgate 42 may be slide transversely in a first direction about shaft 52 such that pin 60 of cylinder 50 disengages first slot 56, tailgate 42 may then be lowered to the open position and slide transversely about shaft 52 in a second direction such that a front edge of pin 60 of cylinder 50 now engages second slot 58 thereby preventing tailgate 42 from being raised prematurely. When secured in the lower position, tailgate 42 allows wheel and tire assembly 11 to be easily rolled into or out of well 20 of dolly 10. When tailgate 42 is secured in the raised or upper position, well 20 of dolly 10 is closed and secures wheel and tire assembly 11 in well 20.

Hinge 44 may also include a spring 62 that is positioned around shaft 52 between cylinders 70 and 50 to bias pin 60 of cylinder 50 to engage first slot 56 and second slot 58 of cylinder 48 depending on the position of tailgate 42. Spring 62 may be used in this manner such that a higher amount of force is required to move tailgate 14 in a first direction to disengage pin 60 from first slot 56 and second slot 58 thereby adding a measure of safety when introducing and securing tire and wheel assembly 11 in well 20 of dolly 10.

Figure 5A:
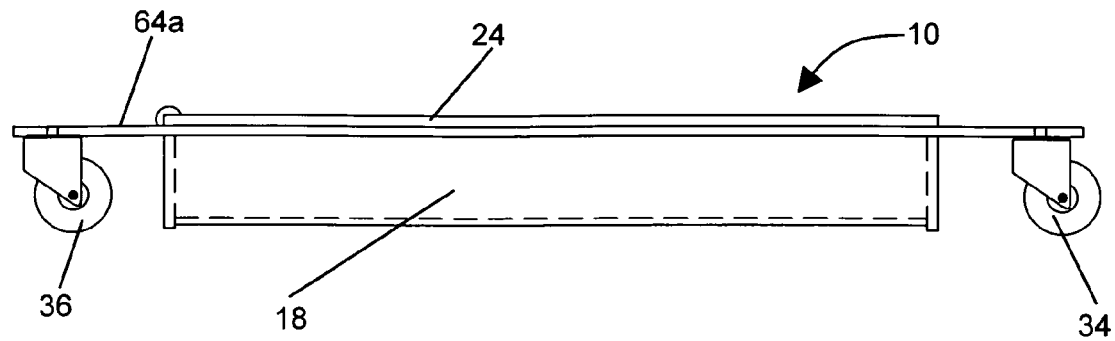
FIG. 5A is a side view of the vehicle wheel dolly according to still another embodiment of the present invention.
Figure 5B:
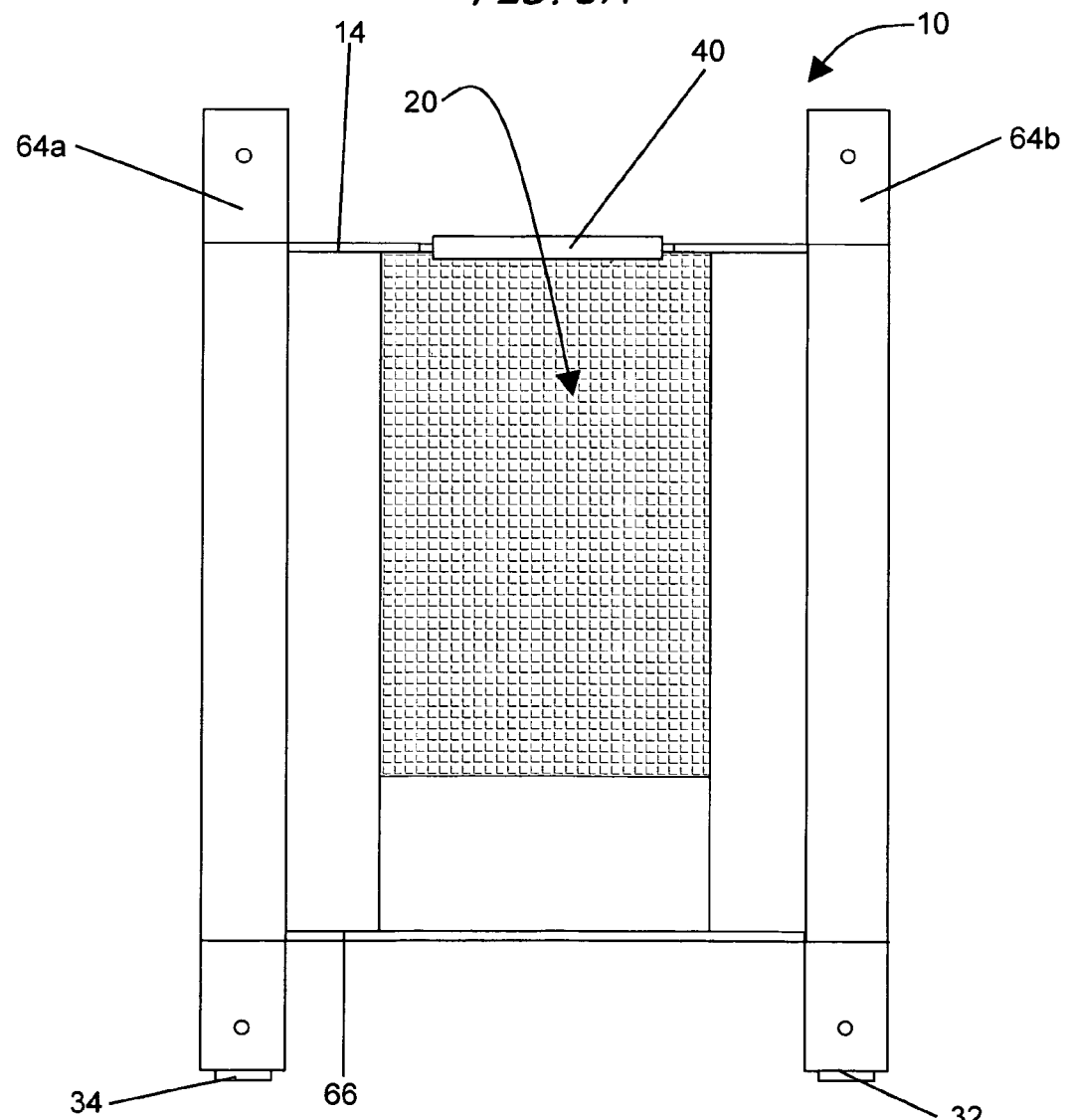
FIG. 5B is a top view of the vehicle wheel dolly according to an embodiment of the present invention.

In yet another embodiment of the present invention shown in FIGS. 5A and 5B, dolly 10 may include outriggers 64a and 64b. Outriggers 64 are positioned parallel to dolly 10 along side walls 16, 18 and extend past rear wall 14 and wings 28 and 30 of front wall 66. Outriggers 64 include casters 32, 34, 36 and 38 positioned at each end. Outriggers 64 may be attached to the four corners of dolly 10 by aligning holes in dolly 10 and outriggers 64 such that a bolt and nut fasteners may be used to assemble outriggers 64 to dolly 10. Alternatively, outriggers 64 may be welded to dolly 10.

Wheel and tire assembly 11 may be introduced to dolly 10 in the same manner as the other described embodiments. In this particular embodiment, however, as wheel and tire assembly 11 enters well 20, outriggers 64 prevent the rear of dolly 10 from tipping upward. The positioning of outriggers 64 is such that they extend outward away from dolly 10 and, more specifically, away from lip 26. As wheel and tire assembly 11 cross over lip 26, outriggers 64 prevent the rear of dolly 10 from tilting upward and as such prevent dolly from contacting the vehicle. In same manner, as wheel and tire assembly 11 move to the rear of dolly 10, outriggers 64 prevent the front of dolly from tilting upward and contacting the vehicle. A ramp may be used (not shown) and positioned at lip 26 at the front of dolly 10 to aid wheel and tire assembly 11 as it enters well 20. Alternatively, outriggers 64 may be used in conjunction with tailgate 42 to ease the entry of wheel and tire assembly 11 into well 20.

Figure 6A:
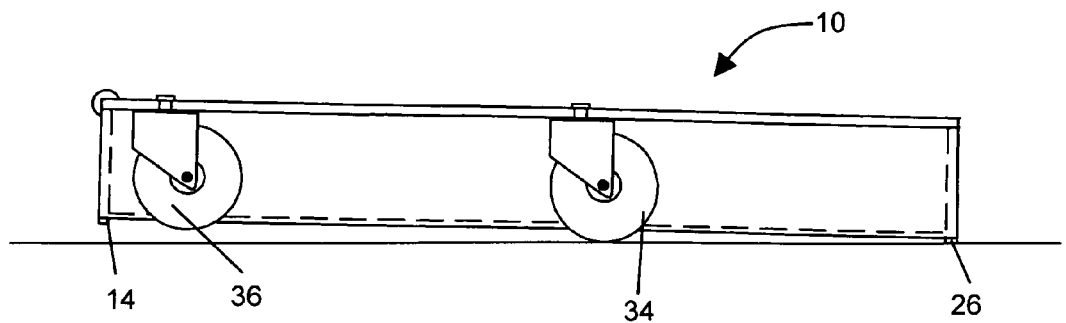
FIG. 6A is a side view of the vehicle wheel dolly according to yet another embodiment of the present invention.
Figure 6B:
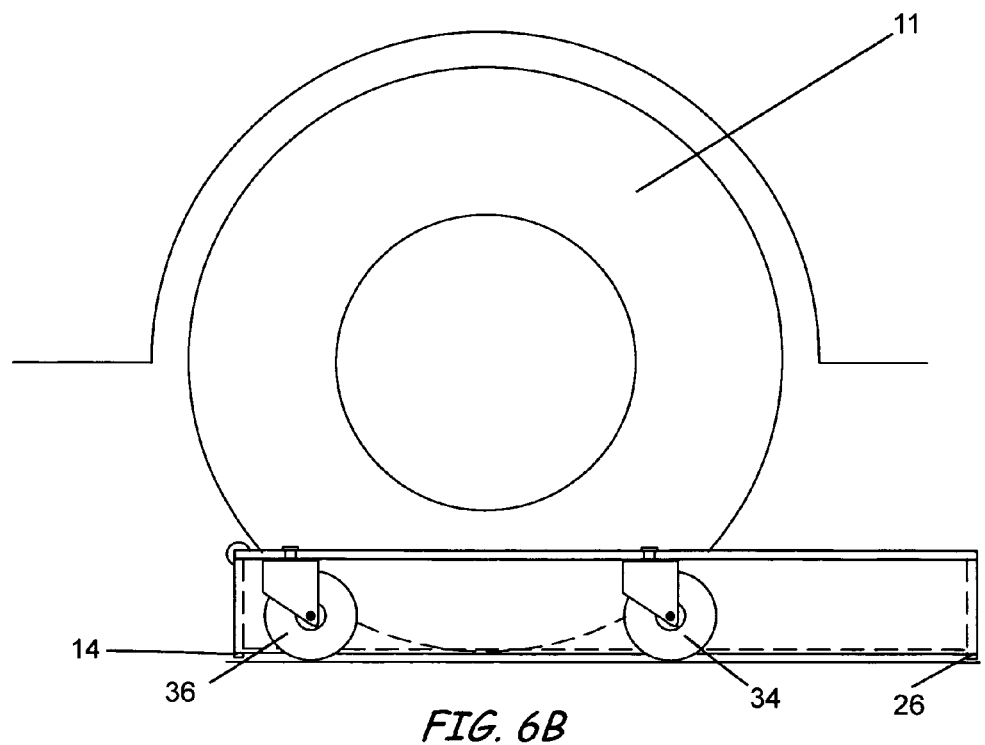
FIG. 6B is a side view of the wheel and tire assembly of the vehicle positioned on the vehicle wheel dolly according to an embodiment of the present invention.

In still another embodiment of the present invention illustrated in FIGS. 6A and 6B, dolly 10 is designed such that wheels or casters 32 and 34 are a fulcrum point for dolly 10. In this particular embodiment, lip 26 extends generally vertically below plate 12. In an unloaded position, lip 26 contacts the floor or other surface along with casters 32 and 34 as shown in FIG. 6A. Caster 36 and 38 are lifted off the floor or other surface. As wheel and tire assembly 11 are introduced to dolly 10, the tire encounters lip 26 as wheel and tire assembly 11 enters well 20. As the wheel and tire assembly 11 passes casters 32 and 34, dolly 10 begins to tilt forward until casters 36 and 38 contact the floor or other surface. As described in other embodiments, rear wall 14 extends generally vertical below plate 12 and will contact the floor or other surface to prevent the front end of dolly 10 from contacting the vehicle as wheel and tire assembly 11 settles into well 20. With wheel and tire assembly 11 now seated in well 20, lip 26 no longer contacts the floor or other surface and dolly 10 may be moved easily on casters 32, 34, 36 and 38.

Dolly 10 may be fabricated from any material that will provided adequate strength to support the weight or partial weight of an automobile while at the same time allowing for the vehicle to be easily moved when each of the wheels of the vehicle are seated in dolly 10. In this particular example, a type of steel has been used to illustrate the fabrication process. It is important to note that any type of material may be used to fabricate dolly 10 and steel has been used merely for illustrative purposes.

Figure 7:
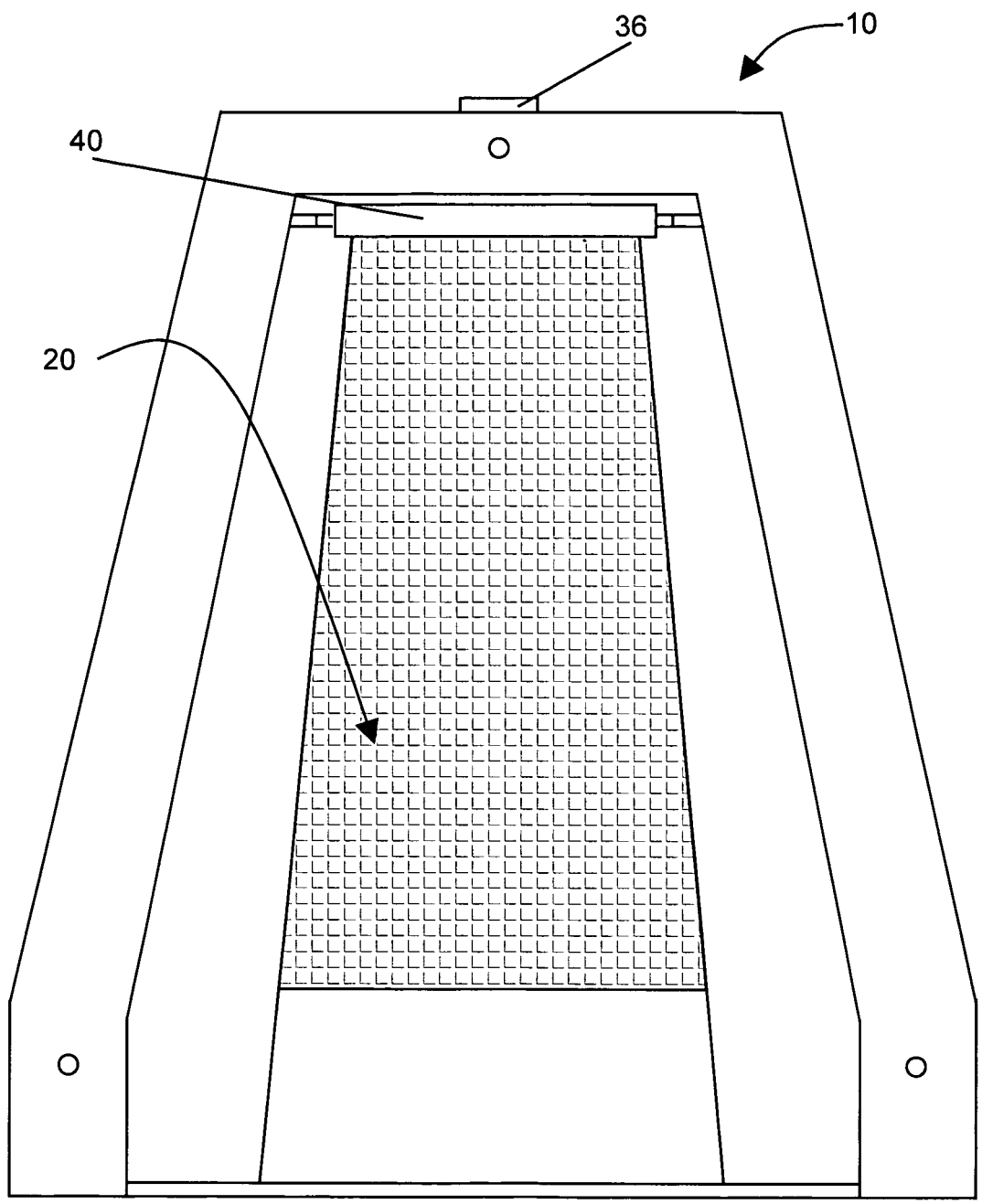
FIG. 7 is a top view of the vehicle wheel dolly according to still another embodiment of the present invention.

In the embodiments described above, dolly was described as being in the general shape of a rectangle. It is important to note that dolly 10 may be fabricated in any design while still maintaining an easy way to position a vehicle onto the dollies with out the use of a vehicle jack or other means of raising the vehicle. For example, dolly 10 may be designed in a generally triangular shape as illustrated in FIG. 7A. Dolly 10, in this configuration, still maintains the concepts of raising a vehicle off the floor without a jack or lift, yet is a different shape.

Any number of wheels or casters may be added to the initial four casters of dolly 10. For example, two more casters may be added to dolly 10 to accommodate heavier vehicles as illustrated in FIGS. 8A and 8B. The heavier vehicles may be driven or pushed onto dolly 10 in much the same manner as described in the various embodiments above.

The present invention has been particularly shown and described with reference to the foregoing embodiments, which are merely illustrative of the best modes presently known for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method within the scope of these claims and their equivalents by covered thereby. This description of the invention should be understood to include all novel and non-obvious combination of elements described herein, and claims may be presented in this or a later application to any novel non-obvious combination of these elements. Moreover, the foregoing embodiments are illustrative, and no single feature or element is essential to all possible combinations that may be claimed in this or a later application.

What is claimed is:

1. A vehicle wheel dolly comprising:
a well for positioning and capturing a tire and wheel assembly of an automobile, said well including:
a generally flat first plate;
a first side wall, said first side wall extending generally upward from said first plate at a first side edge;
a second side wall, said second side wall extending generally upward from said first plate at a second side edge;
a rear wall, said rear wall extending generally upward from said first plate at a rear edge and intersecting said first side wall and said second side wall;
a second plate, said second plate extending generally horizontally outward from said first side wall at a top edge;
a third plate, said third plate extending generally horizontally outward from said second side wall at a top edge;
a lip, said lip extending vertical upward and downward from said first plate at a front edge and configured to engage a ground surface as the tire and wheel assembly enter said well;
a roller assembly, said roller assembly secured to said rear wall near a top edge and configured to absorb forces exerted on said wheel dolly as the tire and wheel assembly enter said well;
a plurality of casters secured to said wheel dolly; and
wherein a first set of casters of said plurality of casters are secured to said second plate and said third plate near said rear wall and a second set of casters of said plurality of casters are secured to said second plate and said third plate said second set of casters configured to be positioned on said second plate and said third plate to create a fulcrum thereby enabling said vehicle wheel dolly to pivot about said second set of casters as the wheel and tire assembly enter said well.

2. The vehicle wheel dolly of claim 1, further including a first wing and a second wing, said first wing extending generally outward from said first side wall and downward from said second plate and said second wing extending generally outward from said second side wall and downward from said third plate.

3. The vehicle wheel dolly of claim 1, wherein said rear wall extends vertically downward from said first plate at said rear edge, said rear wall configured to engage said ground surface and prevent said vehicle wheel dolly from contacting the automobile as the tire and wheel assembly settle into said well.

4. The vehicle wheel dolly of claim 1, wherein said plurality of casters are welded to each end of said second plate and each end of said third plate.

5. The vehicle wheel dolly of claim 1, wherein said plurality of casters are secured to each end of said second plate and each end of said third plate by fastening a nut and bolt of said caster to each of said second plate and said third plate.

6. The vehicle wheel dolly of claim 1, wherein said rear wall includes an aperture, said aperture configured as a handle to facilitate ease of lifting said vehicle wheel dolly.

7. The vehicle wheel dolly of claim 1, wherein the shape of said first plate is generally rectangular.

8. The vehicle wheel dolly of claim 1, wherein the shape of said first plate is generally triangular.

9. The vehicle wheel dolly of claim 1, further including a hinge assembly and tailgate.

10. The vehicle wheel dolly of claim 9, wherein said hinge assembly comprises:
a first cylinder and a second cylinder positioned at said first plate, said first cylinder including a first slot and a second slot;
a third cylinder positioned at said tailgate, said third cylinder including a pin; and
wherein said pin engages said first slot to lock said hinge assembly in a first position and said pin engages said second slot lock said hinge assembly in a second position.

11. The vehicle wheel dolly of claim 10, wherein said hinge assembly further includes a shaft said shaft passes through said first cylinder, said second cylinder, and said third cylinder to secure said first plate to said tailgate.

12. The vehicle wheel dolly of claim 11, wherein said hinge assembly further includes a spring.

13. The vehicle wheel dolly of claim 9, wherein said tailgate includes at least one handle.

14. The vehicle wheel dolly of claim 1, further including a first outrigger and a second outrigger, said first outrigger secured to said second plate and said second outrigger secured to said third plate.

15. The vehicle wheel dolly of claim 14, wherein at least one caster of said plurality of casters is anchored to each end of said first outrigger and at least one caster of said plurality of casters is anchored to each end of said second outrigger.

16. The vehicle wheel dolly of claim 1, wherein a third caster of said plurality of casters is secured to each of said second plate and said third plate near a center point of said wheel dolly.

17. A system for elevating and manually moving a vehicle comprising:
a vehicle having at least one tire and wheel assembly; and
at least one vehicle wheel dolly, said at least one vehicle wheel dolly including:
a generally flat first plate;
a first side wall, said first side wall extending generally upward from said first plate at a first side edge;
a second side wall, said second side wall extending generally upward from said first plate at a second side edge;
a rear wall, said rear wall extending generally upward from said first plate at a rear edge and intersecting said first side wall and said second side wall;
a second plate, said second plate extending generally horizontally outward from said first side wall at a top edge;

a third plate, said third plate extending generally horizontally outward from said second side wall at a top edge;

a lip, said lip extending vertical upward and downward from said first plate at a front edge and configured to engage a ground surface as said at least one tire and wheel assembly enter said vehicle wheel dolly;

a roller assembly, said roller assembly secured to said rear wall near a top edge and configured to absorb forces exerted on said wheel dolly as said at least one tire and wheel assembly enter said vehicle wheel dolly;

a plurality of casters secured to said wheel dolly; and wherein a first set of casters of said plurality of casters are secured to said second plate and said third plate near said rear wall and a second set of casters of said plurality of casters are secured to said second plate and said third plate, said second set of casters configured to be positioned on said second plate and said third plate to create a fulcrum thereby enabling said vehicle wheel dolly to pivot about said second set of casters as the wheel and tire assembly enter said well; and wherein said first plate, said first side wall, said second side wall, and said rear wall create a well for accepting said at least one tire and wheel assembly.

18. The system of claim 17, wherein said rear wall extends vertically downward from said first plate at said rear edge, said rear wall configured to engage said ground surface and prevent said vehicle wheel dolly from contacting the automobile as the tire and wheel assembly settle into said well.

19. The system of claim 17, further including a hinge assembly and tailgate.

20. The system of claim 19, wherein said hinge assembly comprises:

a first cylinder and a second cylinder positioned at said first plate, said first cylinder including a first slot and a second slot;

a third cylinder positioned at said tailgate, said third cylinder including a pin;

a shaft, said shaft passes through said first cylinder, said second cylinder, and said third cylinder to secure said first plate to said tailgate;

a spring; said spring positioned on said shaft between said second cylinder and said third cylinder; and wherein said pin engages said first slot to lock said hinge assembly in a first position and said pin engages said second slot lock said hinge assembly in a second position.

* * * * *